United States Patent [19]
Wong et al.

[11] 4,206,561
[45] Jun. 10, 1980

[54] FISH HOOK EXTRACTOR

[76] Inventors: Willie Wong, 14407 S. Pioneer Blvd.; Jack Wong, 12125 Front St.; Yit C. Wong, 11618 Harverd Dr., all of Norwalk, Calif. 90650

[21] Appl. No.: 962,124

[22] Filed: Nov. 20, 1978

[51] Int. Cl.² ............................................. A01K 97/00
[52] U.S. Cl. ....................................... 43/53.5; 81/3 R
[58] Field of Search ................. 43/17.2, 53.5; 81/3 R; 254/25

[56] References Cited

U.S. PATENT DOCUMENTS

| | | | |
|---|---|---|---|
| 2,272,362 | 2/1942 | Barker | 254/25 |
| 2,541,331 | 2/1951 | Boyd | 43/53.5 |
| 2,828,574 | 4/1958 | Metzger | 43/53.5 |
| 3,008,260 | 11/1961 | Landrum | 43/53.5 |
| 3,009,280 | 11/1961 | Hunter et al. | 43/53.5 |
| 3,013,929 | 12/1961 | Reiling | 81/3 R |
| 3,034,252 | 5/1962 | Basinski | 43/53.5 |
| 3,670,448 | 6/1972 | Wehmeyer | 43/53.5 |
| 3,764,175 | 10/1973 | Yavitch | 81/3 R |
| 3,835,574 | 9/1974 | Harwood | 43/53.5 R |
| 4,014,131 | 3/1977 | Bendik | 43/53.5 |
| 4,145,832 | 3/1979 | Knight, Jr. | 43/17.2 |

FOREIGN PATENT DOCUMENTS

701063 12/1953 United Kingdom ..................... 254/25

*Primary Examiner*—Nicholas P. Godici
*Assistant Examiner*—K. Bradford Adolphson
*Attorney, Agent, or Firm*—Dominick Nardelli

[57] ABSTRACT

A fish hook extractor has an elongated body with a handle means at one end and, at the other end is disposed a fish hook gripping means for gripping the fish hook for removal from the fish. This latter means is shaped essentially like a 2-prong fork wherein each prong has parallel sides and the prongs are parallel to each other. Each prong is preferably wider in the dimension disposed in the plane of the prongs than in the thickness, i.e., in the dimension perpendicular thereto. The base where the prongs come together is formed into a semi-cylindrical surface and coaxial with this semi-cylindrical surface are formed opposing countersunk surfaces each disposed on one side thereof. The ends of each prong are tapered to a point wherein the points are disposed on the outer edges of the respective prongs.

4 Claims, 6 Drawing Figures

U.S. Patent  Jun. 10, 1980  4,206,561
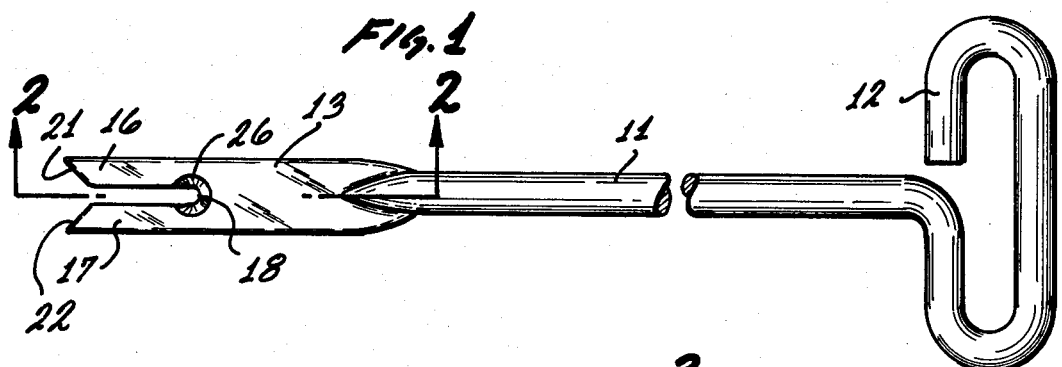
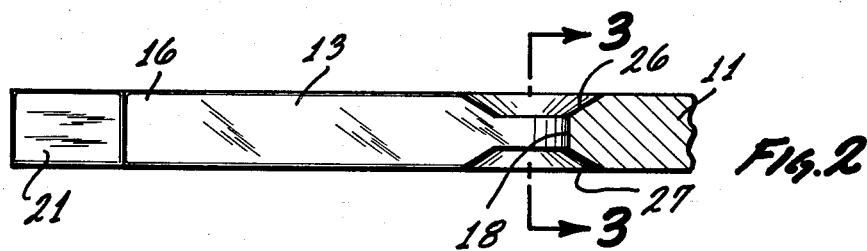
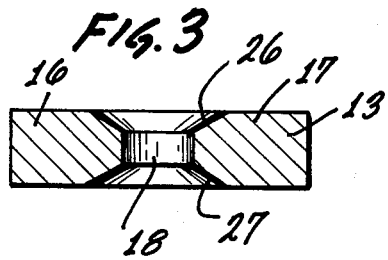
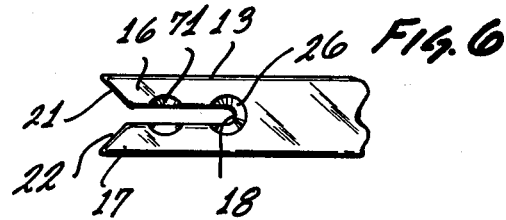
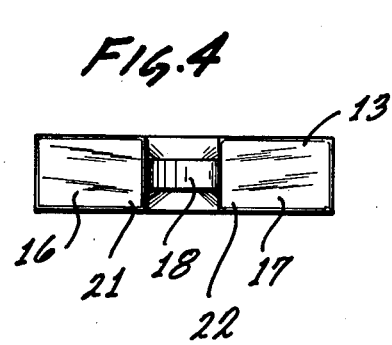
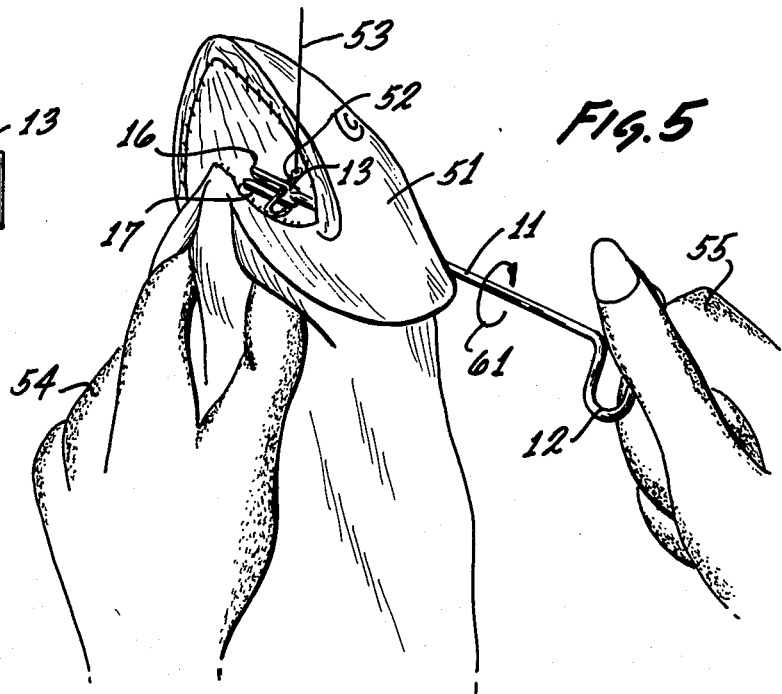

FISH HOOK EXTRACTOR

FIELD OF THE INVENTION

This invention relates to the art of fishing and, more particularly, to a means for extracting fish hooks from the fish.

BACKGROUND OF THE INVENTION

In the past, withdrawing fish hooks from caught fish was difficult, too extremely difficult when one attempts to withdraw the hook from a larger fish. If one attempted to pull the hook, the line would break before the hook let loose. Not only must one remove the fish hook before the fish is processed for eating for obvious reasons, one would also have to replace the lost hook on the line before he can fish again. Although fish hooks are relatively cheap, the process took time and cut into the fishing time, whereby, naturally, the production was lowered. Prior art solutions, such as disclosed in U.S. Pat. Nos. 4,014,131; 3,835,574; 3,670,448; 3,034,252; 3,008,260; and 3,009,280 have either been ineffective or too costly and, as a consequence, fishermen are still confronted with the problem of withdrawing hooks from fish speedily and effectively.

Objects of the Invention

An object of this invention is to provide a new and improved extractor for fish hooks.

Another object of this invention is to provide a fish hook extractor which is simple, easier to use, and quicker than prior art extractors.

Another object of this invention is to provide a fish hook extractor whereby the extractor can be either inserted through the fish mouth, or through its body to clamp onto the hook at one end thereof by a simple twist of the extractor.

These and other objects and features of advantage will become more apparent after one studies the following embodiments of the invention, together with the appended drawing.

BRIEF DESCRIPTION OF THE DRAWING

FIG. 1 is a plan view of one embodiment of our new and useful fish hook extractor.

FIG. 2 is a section of a portion of the extractor taken on line 2—2 of FIG. 1 in the direction of the arrows, and shown in an enlarged scale.

FIG. 3 is a section thereof taken on line 3—3 of FIG. 2 in the direction of the arrows.

FIG. 4 is an end view thereof taken from the left of FIG. 1 or FIG. 2.

FIG. 5 is a pictorial representation of the fish hook extractor in use.

FIG. 6 is an alternate embodiment thereof in plan view.

DETAILED DESCRIPTION OF THE DRAWING

Referring to FIGS. 1 through 4, in particular, the novel fish hook extractor has an elongated slender body 11 preferably made of ⅛ inch diameter stainless steel rod stock. At one end of the body is formed a handle means 12 and at the other end is formed a fish hook gripping means 13. The means 13 consists of a double pronged fork with prongs 16 and 17. The space in between the respective outside edges of each prong 16 and 17 is about ¼ inch, and the spacing between the prongs 16 and 17 is about 1/16th of an inch, or spaced sufficiently apart to allow the body of a given fish hook to fit therebetween as will become apparent hereinafter. The prongs 16 and 17 are disposed parallel to each other and, at a base 18, a semi-cylindrical surface is formed. The thickness of each prong, i.e., the distance perpendicular to the plane containing both prongs, is about 1/16th of an inch. This thickness is shown enlarged in FIGS. 2, 3, and 4 in order to more clearly illustrate the improved features of the extractor. The ends of each prong 16 and 17 are beveled, as shown in FIG. 1, whereby sloping surfaces 21 and 22 face each other. This arrangement allows the fish hook to more readily enter the slot formed between the two prongs 16 and 17, also as will become apparent hereinafter. To grip the fish hook after it is disposed between the prongs, opposing counter-sunk surfaces 26 and 27 are formed which counter-sunk surfaces are coaxial with the axis of the semi-cylindrical surface 18. The counter-sunk surfaces are formed, as shown, and, for example with 30° sloping surfaces. The axial length of surface 18 is about 1/32nd of an inch, or of sufficient thickness to prevent a sharp edge from being formed.

Description of the Use of the Extractor

Referring to FIG. 5, there is shown an illustration of a fish 51, having a fish hook 52 hooked into its mouth, and a line 53 attached to the hook 52. In this picture, the fish is shown being held by a person's left hand 54, the right hand 55 of the person is holding onto the novel extractor by the handle means 12. The gripping means 13 or the prong end is pierced through preferably one of the gills until the means 13 is disposed within the fish's mouth cavity. The slenderness of the extractor allows it to readily enter the fish. The means 13 is maneuvered until the hook is between the prongs 16 and 17 and against surface 18. Then, by twisting the handle means 12 in the direction as shown by arrow 61, the hook 62 is locked between the prongs and then the point of the hook 52 is readily disengaged from the fish. One can see that when the hook is disposed at an angle with the axis of surface 18 (the counter-sunk surfaces 26 and 27 allows for the non-alignment), the fish hook 26 cannot be removed from the extractor's gripping means 13. When the hook is pivoted with respect to the extractor into alignment with the axis of surface 18, then it may be removed. Also, one can readily understand that sometimes one would need to twist the extractor in a direction opposite from that to which arrow 61 points to extract the fish hook 52.

A second embodiment of the extractor is shown in FIG. 6. The gripper means 13 again has similar prongs 16 and 17, semi-cylindrical surface 18, bevel surfaces 21 and 22, and counter-sunk surfaces 26 and 27, of which only surface 26 is shown in FIG. 6. Then to further ensure that the fish hook 52 is gripped by the extractor, I have formed another pair of opposing counter-sunk surfaces, of which counter-sunk surface 71 is representative thereof. This other pair of counter-sunk surfaces are coaxial to each other and at opposite sides of the gripping means 13, and the axis thereof are parallel and spaced from the axis of the first pair of counter-sunk surfaces 26 and 27.

Having described the preferred embodiments or our invention, one skilled in the art, after reading the above detailed description thereof, can devise other embodiments without departing from the spirit of our invention. Therefore, our invention is to be considered to include all embodiments falling within the scope of the appended claims.

We claim:

1. A fish hook extractor comprising:
an elongated body;
a handle means attached to one end of said body;
a fish hook gripping means attached to the other end of said body;
said gripping means having:
a first and second prong disposed parallel to and spaced from each other to form a space therebetween which prongs have parallel sides facing each other;
said prongs being disposed to extend from said body;
said body having a semi-cylindrical surface disposed between said prongs so that the diameter of said semi-cylindrical surface is the same as the space between said prongs;
a pair of opposing counter-sunk conical surfaces formed on said gripping means and coaxial with said semi-cylindrical surface.

2. The extractor of claim 1 wherein said gripping means further comprises:
said prongs are disposed parallel to each other so that the spacing therebetween is substantially uniform.

3. The extractor of claim 2 wherein said gripping means further comprises:
said prongs, each having its outside edges parallel to one another;
each of said prongs having a bevel surface formed on its respective ends, with the bevel surfaces facing each other.

4. The extractor of claim 3 wherein another pair of aligned and opposing counter-sunk surfaces are formed on the prongs of said gripping means wherein the axis of said other pair is parallel to and spaced from the axis of said first pair of counter-sunk surfaces.

* * * * *